No. 645,805.  
R. S. GRAHAM.  
HAMMOCK.  
(Application filed Aug. 2, 1899.)  
Patented Mar. 20, 1900.
(No Model.)
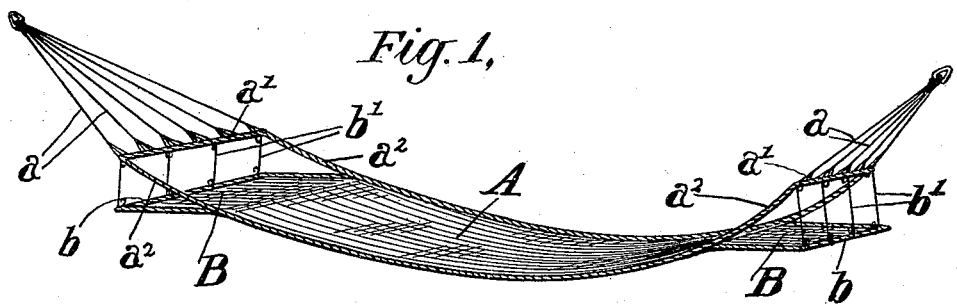
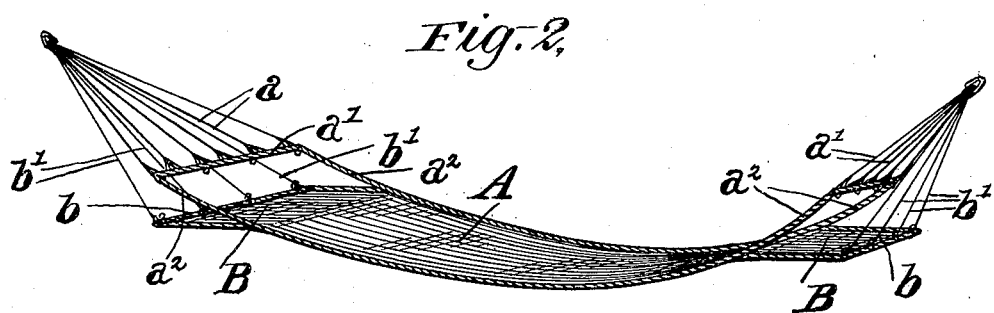
WITNESSES:
INVENTOR  
Robert S. Graham  
BY  
HIS ATTORNEY

UNITED STATES PATENT OFFICE.

ROBERT S. GRAHAM, OF NEW YORK, N. Y., ASSIGNOR TO H. S. MARTIN.

HAMMOCK.

SPECIFICATION forming part of Letters Patent No. 645,805, dated March 20, 1900.

Application filed August 2, 1899. Serial No. 725,875. (No model.)

*To all whom it may concern:*

Be it known that I, ROBERT S. GRAHAM, a citizen of the United States of America, residing in the borough of Manhattan, city, county, and State of New York, have invented certain new and useful Improvements in Hammocks, of which the following is a specification.

My invention relates to hammocks.

I will describe a hammock embodying my invention and then point out the novel features thereof in the claims.

In the accompanying drawings, Figure 1 is a perspective view of a hammock embodying my invention. Fig. 2 is also a perspective view of a hammock embodying my invention and showing a modification in the manner of suspending the end portion thereof.

Similar letters of reference designate corresponding parts in both views of the drawings.

A represents the main body of a hammock, and $a$ the usual suspension-cords or other devices which are located at the ends of the hammock-body. At each end of the hammock-body I preferably employ a spreader $a'$, to which the suspension-cords may be connected, if so desired.

B represents portions of suitable material located at the ends of the main body A. The portions B are preferably of the same material as the main body A, and they may be integral therewith. In the drawings they are shown as being integral with the main body A. When they are integral, they are produced by slitting the main body, preferably along each longitudinal edge, in order that the portions B may be of substantially the same width as the main body. The portions $a^2$ of the hammock-body are then reinforced in order that they may safely suspend the weight in the main body. The free edges of the portions B are also reinforced, and suspension-cords or other devices $b'$ are provided for them. In the form shown in Fig. 1 the suspension-cords extend from their ends to the spreaders $a'$, while in Fig. 2 the cords extend from their ends to the eyes to which the cords $a$ are connected. The suspension-cords may, however, extend where desired and may be of any length, their purpose being to support or suspend the ends B in any desired plane. One advantage of the ends or end portions B is that they can be adjusted to be in substantially the same horizontal plane as the main portion A, thereby enabling an occupant to lie in a substantially-straight position. Either end can be suspended independently of the other, and the main body may be hung in different arcs and either or both ends suspended to any desired position.

When the whole device is to be used as an ordinary hammock, the ends B are connected to the spreaders $a'$ by any desired means. I have shown hooks and eyes for this purpose. Each end B is provided with a spreader $b$, and either the hooks or eyes may be secured to them.

It will be seen that my invention comprises a main hammock-body having suspension means and portions B at the ends thereof, which are provided with separate suspension means.

What I claim as my invention is—

1. A hammock comprising a main body, means for suspending said main body, and portions at the ends of said main body having separate suspension means.

2. A hammock having end portions formed out of the hammock-body, means for connecting the ends of said portions with the ends of the hammock-body, and means for holding the said portions suspended.

3. A hammock comprising a body portion, integral portions at the ends of the body portion, devices for detachably connecting together the ends of said portions and the hammock-body, and means for suspending said portions when disconnected from the hammock-body.

4. A hammock comprising a body portion, a spreader at each end of the hammock, integral portions at the ends of the hammock-body, spreaders for said portions, devices for detachably connecting together said spreaders, and means for holding suspended said portions when the spreaders are disconnected.

5. A hammock comprising a main body, means for its suspension, end portions formed out of the main body and extending substantially the width thereof, and separate means for holding the end portions suspended.

6. A hammock comprising a main body portion, suspension-cords attached thereto, end portions integral with the body portion and extending substantially the width thereof, and independent suspension-cords attached to the end portions.

In testimony whereof I have signed my name to this specification in the presence of two subscribing witnesses.

ROBERT S. GRAHAM.

Witnesses:
   F. O. AFFELD, Jr.,
   GEO. E. CRUSE.